Aug. 28, 1951     G. B. BROWN     2,565,470
PARACHUTE PACK AND RELEASE MEANS THEREFOR
Filed Feb. 21, 1944     7 Sheets-Sheet 1

FIG. 1.

Inventor
*G. B. Brown*

By

Attorney

Aug. 28, 1951   G. B. BROWN   2,565,470
PARACHUTE PACK AND RELEASE MEANS THEREFOR
Filed Feb. 21, 1944   7 Sheets-Sheet 2
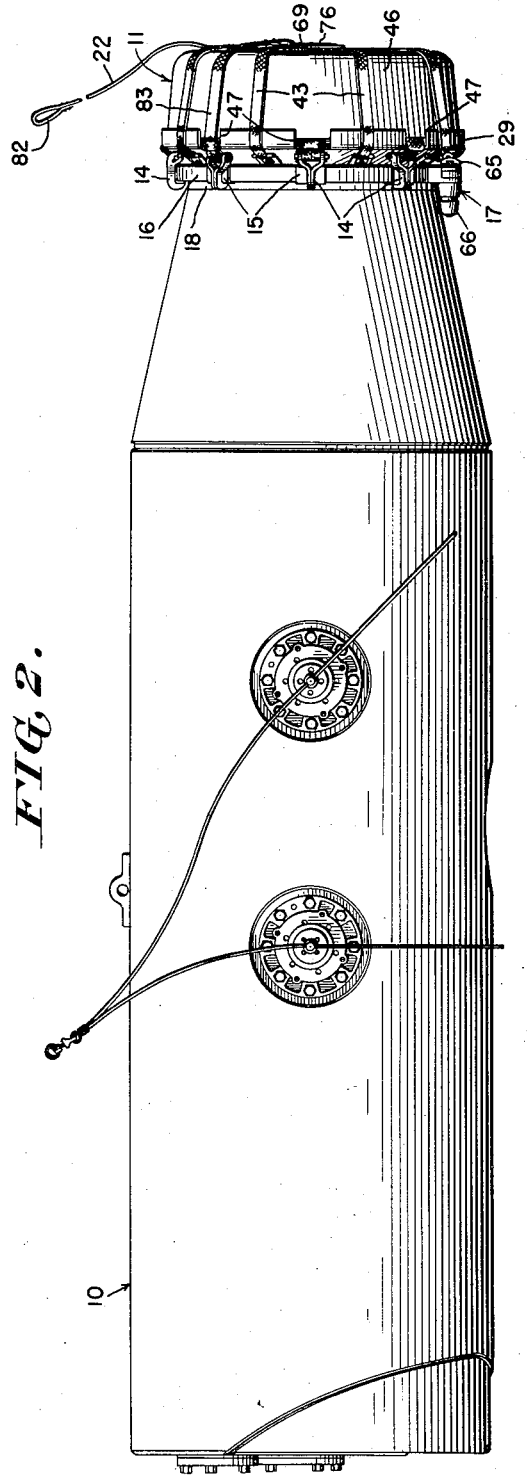
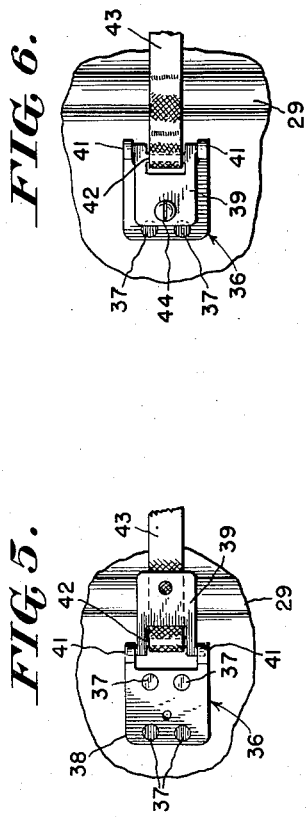
Inventor
G. B. Brown
Attorney Aug. 28, 1951 G. B. BROWN 2,565,470
PARACHUTE PACK AND RELEASE MEANS THEREFOR
Filed Feb. 21, 1944 7 Sheets-Sheet 3

Inventor
G. B. Brown

By
J. J. Fitzgerald
Attorney

Aug. 28, 1951  G. B. BROWN  2,565,470
PARACHUTE PACK AND RELEASE MEANS THEREFOR
Filed Feb. 21, 1944  7 Sheets-Sheet 4

Inventor
G. B. Brown
By
Attorney

Inventor
G. B. Brown

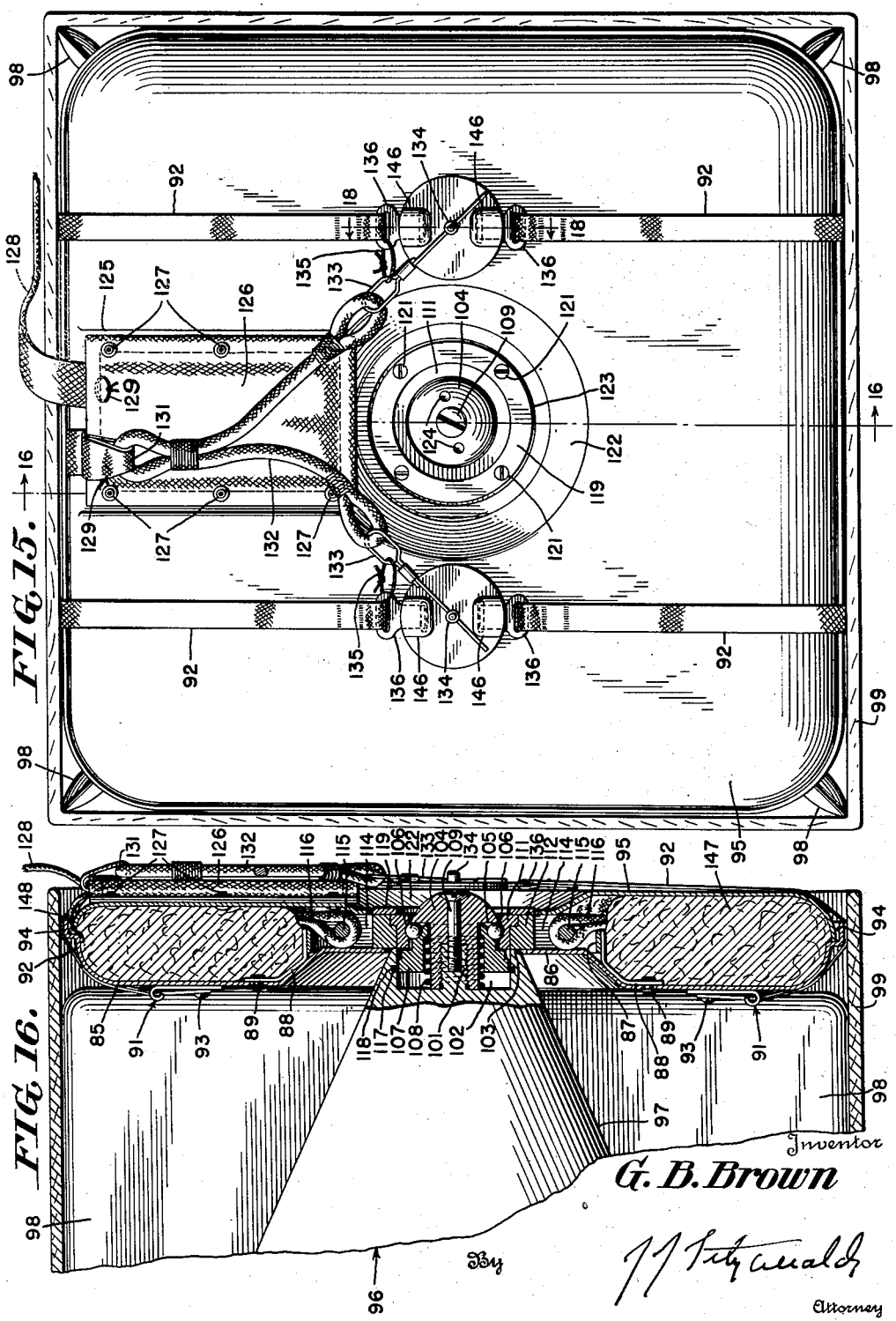

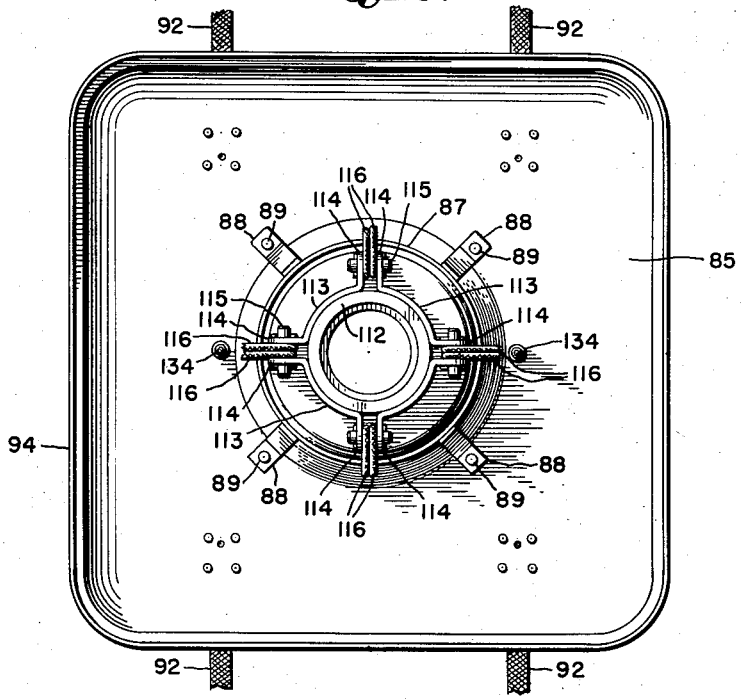

Patented Aug. 28, 1951

2,565,470

UNITED STATES PATENT OFFICE 2,565,470

PARACHUTE PACK AND RELEASE MEANS THEREFOR

Graham B. Brown, Washington, D. C.

Application February 21, 1944, Serial No. 523,247

15 Claims. (Cl. 244—138)

(Granted under the act of March 3, 1883, as amended April 30, 1928; 370 O. G. 757)

This invention relates to a parachute pack and release means therefor and more specifically to a pack for a parachute employed for retarding the downward movement and effecting the safe descent and landing of objects from aeronautical vehicles in which the parachute is automatically disconnected from the object in response to the shock of impact as the object lands within a target area.

The invention is particularly adapted for use with aircraft planted marine mines in which the parachute is compactly stowed within a rigid pack comprising two separable members secured to the mine prior to the launching thereof and in which means are employed to cause the parachute to open when the mine has dropped a predetermined distance from the aircraft thereby to enable the mine to be planted within a target area with a high degree of accuracy. As the mine strikes the surface of the water, the shock of impact causes an inertia member to operate and disconnect the parachute from the mine.

In devices of this class heretofore devised, it has been the usual practice to stow the parachute within a pack composed of flexible material such, for example, as canvas. These packs have not proven altogether satisfactory under conditions of service for the reason that considerable difficulty has been experienced in maintaining the pack in a predetermined restricted shape and size and furthermore, particularly in the case of a large parachute, the pack has proved to be difficult to handle.

In the arrangement of the present invention, the pack is composed of two rigid complementary sections within which the parachute and shroud lines are stored, the sections being held together releasably by a plurality of straps adapted to be released by means controlled by a static cord secured to the aircraft when the mine has dropped a predetermined distance from the aircraft. The static cord is also attached to the hem cord of the parachute thereby quickly hauling the parachute out of the pack and into the air, the upper portion of the pack being cast aside concurrently therewith. The static line includes a length of cord, hereinafter referred to as a break cord, of lesser tensile strength than the static line thereby to cause the static connection to be broken when the tension applied thereto by the parachute is sufficient to snap the break cord.

The parachute is provided with a plurality of shroud lines secured at intervals to a hem cord and attached at the opposite end thereof to an annular member releasably held in place by an inertia controlled element and adapted to disconnect the shroud lines from the mine in response to the shock of impact of the mine against the surface of the water.

One of the objects of the present invention is the provisions of a new and improved parachute pack detachably secured to a load in which the pack and load are of predetermined size and shape.

Another of the objects is the provision of a new and improved parachute pack of predetermined size and shape in which means are provided for tightly stowing the parachute therein.

Another object is the provision of a new and improved parachute pack for a mine adapted to be planted from an aircraft in flight and which will not be deformed by the slip stream to which the pack is exposed during the flight.

Another of the objects is to provide a new and improved parachute pack adapted to be carried by an airplane within the slip stream thereof in which the parachute stowed therein is protected from the weather while the airplane is passing through a storm.

Another of the objects is the provision of new and improved inertia controlled means for disconnecting a parachute from a mine as the mine strikes the surface of a body of water.

A further object is the provision of means for disconnecting the parachute and a portion of the pack from the mine as the mine strikes the surface of a body of water.

A still further object is to provide a new and improved parachute pack having means for tightly stowing a parachute therein which is economical to manufacture, reliable in operation, and which possesses all of the qualities of ruggedness and durability in service.

Still other objects, advantages and improvements will become apparent from the following description taken in connection with the accompanying drawings of which:

Fig. 1 shows in diagrammatic form the launching from an aircraft in flight of a submarine mine employing the device of the present invention;

Fig. 2 is an enlarged view of the mine of Fig. 1 showing the parachute pack secured thereto;

Fig. 5 is a view of one of the fasteners employed with the device of the present invention showing the parts in an open position with the parts hooked together;

Fig. 6 shows the fastener of Fig. 5 in a closed and locked position;

Fig. 15 is a view in elevation of the parachute pack according to an alternative form of the invention;

Fig. 16 is a fragmentary view taken substantially along the line 16—16 of Fig. 15 showing an end portion of the mine partly in section;

Fig. 17 is a view of the dished portion of the parachute casing viewed from the inside with the parachute and cover removed;

Fig. 18 is a fragmentary view somewhat enlarged taken substantially along the line 18—18 of Fig. 15;

Fig. 19 is a view in perspective of one of the fasteners employed with the device of Fig. 15;

Fig. 20 is a view in perspective of the inner disk suitable for use with the fastener of Fig. 19;

Fig. 21 is a view in perspective of the outer locking disk employed with the fastener shown in Fig. 19; and, Fig. 22 shows a modified arrangement for releasably holding the cover fastening straps.

Figure 3:
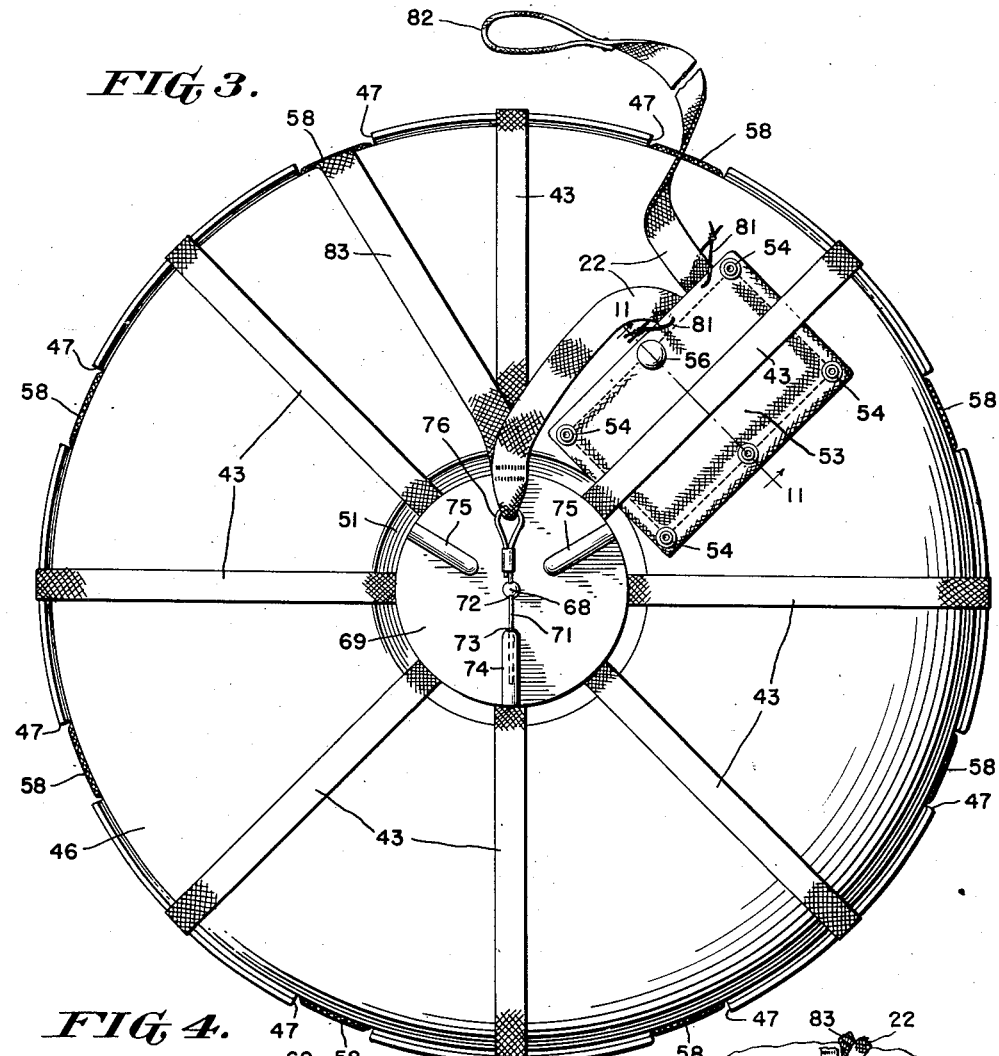
Fig. 3 is an end view somewhat enlarged of the parachute pack of Fig. 2.
Figure 4:
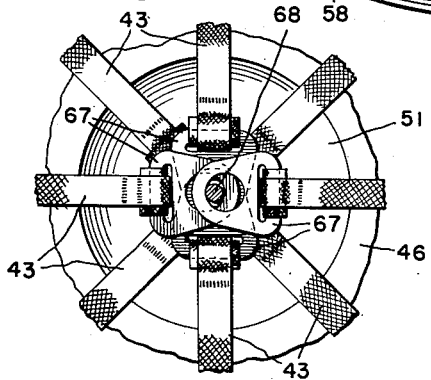
Fig. 4 is a fragmentary view somewhat enlarged and partly in section showing a preferred form of structure for releasably maintaining the parachute pack in a closed condition.

Referring now to the drawings on which like numerals of reference are employed to designate like parts throughout the several views and more particularly to Fig. 1 thereof there is shown thereon a mine indicated generally by the numeral 10 provided with a parachute pack 11 within which is stowed, prior to the launching of the mine, a parachute 12. The parachute is connected by a plurality of shroud lines 13 to a plurality of hooks 14, Fig. 2, respectively connected thereto, each of the hooks having an L-shaped member 15 respectively secured thereto in any suitable manner as by welding the parts together. Each of the L-shaped members 15 is secured to a separable ring 16 held together at the ends thereof by a releasable inertia device indicated generally at 17 in registered engagement with an annular member 18 secured to the tail of the mine. The mine may be of any type suitable for the purpose such, for example, as the mine disclosed and claimed in the copending application of John I. Thompson et al. for Marine Mine, Serial No. 523,088, filed February 19, 1944.

The mine 10 is adapted to be released from the aircraft 19 of Fig. 1 and fall away from the craft as at 21 when released therefrom. When the static cord 22 releases the upper portion of the parachute pack, the pull of the static cord causes the parachute 12 to be withdrawn therefrom and filled with air by the forwardly and downwardly moving mine as at 23. The mine is suspended from the parachute as at 24 and strikes the surface of the water as at 25, the force of impact of the mine against the water causing the parachute to be detached from the mine and, after floating for a brief period of time on the surface of the water as at 26, to come to rest on the bed of the body of water as at 27. The mine continues to travel through the water and come to rest on the bed thereof as at 28.

The mine pack comprises a curved base 29 preferably of symmetrical shape, and provided at the central portion thereof with a support 31 having a flange or disk 32 secured thereto adapted to clamp the base 29 at the central portion thereof as by the clamping plate 33 and rivets 34. The support 31 is threaded interiorally and adapted to be attached to the tail cover of the mine 10 by the threaded plug 35 secured thereto, the tail cover being preferably curved substantially as shown thereby to conform generally to the contour of the base 29 and provide a compact arrangement of the pack and the mine. The base 29 is provided with a plurality of toggle fasteners or clasps 36 arranged exteriorly thereon and secured thereto in any suitable manner as by the rivets 37, the clasp comprising a bifurcated member 38 having a toggle member 39 pivotally secured thereto as at 41 and an element 42 transversely arranged within the toggle member to which one end of a flexible strap 43 is secured.

When the flexible straps 43 have been drawn tightly together about the pack and secured, as will more clearly appear as the description proceeds, the toggle member 39 is moved to the position shown on Fig. 6 thereby additionally tightening the straps 43. The toggle member is locked in the position shown on Fig. 6 by any suitable means such as the screw 44 illustrated. The base 29 is provided at the periphery thereof with a lip section 45 adapted to receive and support a cover 46, a plurality of recessed portions 47 being provided in the base at the lip portion thereof for the purpose of enabling the shroud lines to extend from the pack while the cover is assembled thereto. The base 29 and cover 46 are composed of rigid material suitable for the purpose such, for example, as canvas impregnated with phenol formaldehyde or urea formaldehyde although, if desired, the cover and base may be composed of metal.

Figure 11:
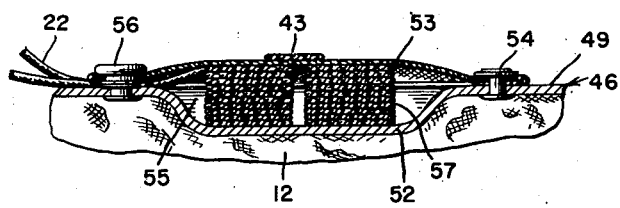
Fig. 11 is a sectional view of the pocket taken along the line 11—11 of Fig. 3 and showing a portion of the static line arranged therein.
Figure 12:
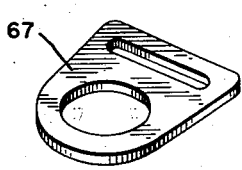
Fig. 12 is a view in perspective of one of the eye fasteners employed with the device of the invention.
Figure 13:
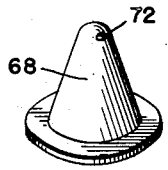
Fig. 13 is a view in perspective of a detachable conical button suitable for use with the eye fastener of Fig. 12.
Figure 14:
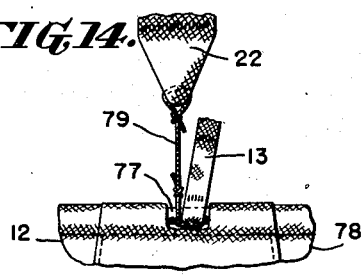
Fig. 14 shows the means for attaching one end of the static line to the hem cord of the parachute.

The cover 46 comprises a tapered portion 48 and a substantially flat portion 49 having a recessed portion 51 centrally arranged therein. The cover is also recessed as at 52, Fig. 11, and provided with a flap 53 secured thereto as by the rivets 54 thereby to form a pocket 55 adapted to be partially closed by a snap fastener 56 having two complementary detachable elements secured to the cover 46 at the flat portion 49 thereof and to the flap 53 respectively. There is arranged within the pocket 52, a length of static line 57, the purpose of which will be more clearly apparent as the description proceeds. The arrangement thus far described, comprises a rigid parachute pack having two separable sections and adapted to enclose and protect from the weather a parachute such, for example, as the parachute disclosed and claimed in my Patent 2,411,868 of December 3, 1946.

The manner in which the parachute is stowed within the pack will now be described. The parachute 12 is provided, for the purpose of illustration, with 32 shroud lines, four adjacent shroud lines being grouped together and secured to a sleeve 58 composed of canvas or the like and provided with a wire clip 59 thereon substantially as shown, the sleeve 58 being secured to an end portion of the shroud lines at a predetermined distance from the loop 61 formed thereon. The shroud lines are disposed within the recessed portions 47 of the base 29 with the clips 59 arranged within the base and in substantial abutting relation therewith. The hooks 14 are adjusted about the annular member 18 and the inertia member 17 comprising a slideable rod or plunger 62 is inserted within the end portions of the split ring 16 thereby releasably securing the split ring and hooks to the tail end of the mine. The rod 62 is provided with a collar 63 and an aperture 64 within which is arranged a wire or rod 65 composed of metal suitable for the purpose such, for example, as copper adapted to be sheared by the force of inertia of a weight 66 secured to the rod as the mine strikes the surface of a body of water and thereby release the split ring 16 and cause the parachute to be detached from the mine.

The remaining portion of the shroud lines and the canopy is folded into a compact mass or stow and the cover 46 is placed thereover in substantial register engagement with the lip section 45 of the base. The cover 46, it will be noted, is relatively deep in proportion to the width thereof whereby a considerable portion of the parachute is exposed to the dragging action of the air as the cover is removed from the base thereby assisting the static line in quickly and positively opening the canopy at a predetermined distance from the aircraft.

The straps 43 are now brought over and around the cover 46 and the lugs 67 secured thereto are placed in registered engagement with a release cone 68, the release cone being preferably tapered as shown to facilitate the placing of the lugs thereon and the release of the lugs therefrom in response to a pull on the static cord. When all of the lugs 67 have been arranged on the release cone 68, a cover or disk 69 is placed on top of the lugs and an arming pin 71 inserted within an aperture 72 disposed within the apex of the cone member 68, the arming pin additionally passing through an aperture 73 formed within a raised portion 74 of the plate 69. The plate 69 is also preferably provided with two additional raised portions 75 whereby the portions 74 and 75 are employed to strengthen the plate 69 and maintain the plate substantially flat at all times. The arming pin 71 is provided with an eye 76 to which is secured a looped portion of the static line 22, the end of the static line being secured to the hem cord 77 of the parachute canopy 78 by a short length of cord 79 having a lesser tensile strength than the static line or the hem cord whereby the static line is disconnected from the hem cord by the breakage of the cord 79 when the parachute has been pulled clear of the pack.

The toggle members 39 are now moved to the position shown on Fig. 6 and secured by the screws 44 respectively associated therewith thereby additionally tightening the straps 43 and tightly stowing the parachute within the pack by bringing the cover 46 into secure registered engagement with the base 29. The parachute is now tightly stowed within the pack. When placing the lugs 67 on the release cone 68, it has been found desirable to arrange the lugs such that adjacent lugs are associated with a pair of diametrically arranged straps whereby the pull of each strap against the release cone is directly opposed by the pull of a diametrically arranged strap. The forces acting on the cone 68 are therefore balanced and thus there is no possibility of failure of the lugs to release from the cone member as the arming pin 71 is withdrawn therefrom.

A suitable length such, for example, as a length of five feet of static line is stowed within the pocket 55 and the line is secured to the edge of the pocket by a light line or cord 81 at each of the points of emergence of the static line therefrom. The snap fastener 56 is now closed. The remaining length of static line is provided with a loop 82 suitable for attachment to the aircraft at a relatively short distance such, for example, as four feet from the pocket. The length of static line 83 extending between the arming pin 71 and the hem cord is of just sufficient length to complete the connection therebetween when the parachute is stowed within the pack and thus the length 83 of the static cord is drawn tightly against the cover 46 whereby there is no possibility of the arming pin being prematurely withdrawn from the release cone 68 as the result of pressure of the air thereagainst when the mine is arranged within the slip stream of the aircraft.

The operation of the parachute and the release means therefor will now be described. Let it be assumed, by way of example, that a parachute has been stowed within the pack 11 secured to the tail portion of the mine 10 and the shroud lines are connected to the annular member 18 of the mine by the hooks 14 and the split ring 16, the split ring being detachably maintained in the assembled position by the inertia device 17 and the shear wire 65 has been assembled within the end of the plunger 62. Let it further be assumed that the mine is releasably secured to an aircraft, such as the aircraft 19 illustrated, within the slip stream thereof and that the end of the static line at the looped portion 82 thereof has been made fast to the aircraft.

As the mine is released from the aircraft in flight, the mine starts to fall away from the aircraft thereby causing the cords 81 to be broken and the additional loop portion of the static cord within the pocket 55 to be withdrawn therefrom. When the mine has traveled a predetermined distance from the aircraft, the arming pin 71 is withdrawn from the release cone 68 and the straps 43 are released.

As the portion 83 of the static cord becomes taut, the parachute is pulled forcibly from the base 29 of the pack thereby causing the cover 46 to be quickly detached and the parachute to be brought into the slip stream of the falling mine. The canopy of the parachute is thus quickly opened, and detached from the static cord as the break cord 79 snaps in response to the strain applied thereto by the hem cord 77. By providing an arrangement of the type disclosed in which the parachute is quickly opened at a predetermined distance from the aircraft in flight, the mine is adapted to be planted with a high degree of precision within the target area.

As the mine strikes the surface of the water, the inertia of the mass 66 of the inertia element 17 causes the wire 65 to be sheared and the rod 62 to be withdrawn from the ends of the split ring 16. When this occurs, the split ring springs open by reason of an initial tension applied thereto, the opening of the split ring being further accelerated by the provision of a flat spring 84 arranged between the split ring and the periphery of the annular member 18. The parachute is thus disconnected from the mine at the moment of contact of the mine with the surface of the water and drifts away and comes to rest on the bed of a body of water, the mine sinking within the water and coming to rest on the bed thereof without leaving a trace of its whereabouts.

On Figs. 15 and 16 there is shown a parachute pack and releasing means therefor in accordance with an alternative form of the invention, in which the parachute and the base of the pack are released from the mine as the mine strikes the surface of the water, the structure comprising a base 85 preferably recessed as at 86. An annular member 87 composed preferably of metal is provided with a plurality of supports 88 secured thereto in any suitable manner as by welding the parts together, the supports being securely attached to the base 85 in any suitable manner as by the rivets 89. Secured to the exterior portion of the base are a plurality of toggle members or clasps 91 similar to the clasps 36 and adapted to tighten the straps 92 respectively connected thereto and thereby tightly stow the parachute within the pack. When the straps have been tightened, the toggle members are secured by the screws 93. The base is provided with a lip portion 94 extending about the periphery thereof adapted to receive and engage a cover 95. The base and cover may be composed of any material suitable for the purpose such, for example, as phenol formaldehyde resin impregnated duck or urea formaldehyde resin impregnated duck or, if desired, the base and cover may be composed of metal.

The means by which the pack is detachably secured to the mine will now be described. The mine indicated generally by the numeral 96 is provided with a tapered tail portion 97 and a plurality of fins 98 secured thereto about which is arranged a stabilizer 99 of material suitable for the purpose such, for example, as plywood secured to and supported by the fins. The tail of the mine is provided with a threaded post 101 arranged coaxially with respect to the mine casing and recessed therein thereby to form an annular chamber 102 and a circular shoulder 103 on the tail portion of the mine casing. Threaded upon the post 101 is a cylindrical member 104 having a shoulder or collar 105 thereon adapted to engage a plurality of locking balls 106 sufficient in number to withstand the load applied thereto by the parachute. Slideably arranged upon the cylindrical member 104 is an annular inertia member 107 comprising a race adapted to receive and engage the balls 106, the member 107 normally being urged outwardly into locking engagement with the balls by a spring 108 arranged about the member 104 at the cylindrical portion thereof.

The member 104 is maintained in the assembled position with respect to the post 101 by any suitable means such, for example, as the screw 109 having a thread formed thereon in a direction reverse to the direction of the thread on the post. The balls are adapted to engage an outer locking race 111 or be released therefrom selectively in accordance with the instant position of the member 107. The member 111 is in registered engagement with an annular member 112 having secured thereto in any suitable manner, as by welding the parts together, a plurality of supports 113 having ears 114 projecting therefrom adapted to receive a plurality of pins 115 and thereby secure the inner or lower portions of the shroud lines 116. The ears 114, it will be noted, also engage the base member of the pack at the portion 86 thereof thereby securing the base to the mine until the shroud lines have been disconnected therefrom as the mine strikes the surface of the water by the ball release mechanism controlled by the inertia member 107. When this occurs, the inertia member 107 is maintained in the moved or operated position by a locking member 117 comprising a compression ring slideably arranged within a recessed portion 118 of the mine casing enclosing the chamber 102 and adapted to lock the member 107 by engaging a reduced cylindrical portion thereof. The race 111 is maintained in registered engagement with the member 112 by a locking ring 119 secured to the member 112 as by the screws 121.

The cover 95 is provided with a circular recessed portion 122 having an aperture 123 therein of sufficient size to permit the assembly of the member 104 on the post 101 of the mine, the assembly being facilitated by the provision of a pair of recessed portions 124 within the member 104 adapted to receive a suitable tool. When the member 104 has been securely tightened against the post 101, the screw 109 is secured. There is also preferably provided within the cover 95 a recessed portion 125 of sufficient size to receive a pocket 126 comprising a piece of canvas or other fabric material folded and secured thereto as by the rivets 127 within which is stowed a length of static line 128. The static line is releasably secured to the pocket at the points of emergence therefrom by the cords 129. The static cord is provided with a loop 131 to which is secured a central looped portion of a rip cord 132, the rip cord being secured at the ends thereof to a pair of arming pins 133 respectively disposed within the end of a pair of posts 134. The premature withdrawal of the arming pins from their respective posts is prevented by a light cord or line 135 securing the arming pin to the pair of lugs 136 to which the straps 92 are attached.

Each of the posts 134 is arranged within a pair of apertures within the base 85 and within the cover 95 respectively, one end of the post being provided with a washer or shoulder 137 secured thereto for engaging the base 85 and the opposite end portion of the post having a shoulder 138 formed therein and adapted to be engaged by a circular plate 139 having an aperture 141 therein of sufficient size to support the plate 139 slideably upon the post 134 at a reduced cylindrical portion 142 thereof. The plate 139, it will be noted, is provided with two slots 143 adapted to engage the lugs 136 at the bent over end portions 144 thereof and releasably secure the lugs to the plate by reason of the provision of a second plate 145 slideably arranged on the reduced portion 142 of the post 134 and releasably maintain the plate 145 in substantial abutting relation with the plate 139 by the arming wire 133, the plate 145 having two diametrically arranged recessed portions 146 therein adapted to clamp the lugs 136 to the plate 139.

The pack is adapted to enclose and tightly stow a parachute 147 arranged therein and protect the parachute at all times during the handling and transportation of the mine. The inner end of the static line 128, it will be noted, is disposed between the cover and the base as at 148 at a point relatively near the edge of the pocket 126 and secured to the hem cord of the canopy of the parachute. By arranging the edge of the pocket 126 relatively close to the periphery of the cover 95, there is no possibility of the inner length of the static cord being withdrawn from the pocket by the slip stream of the aircraft in cases where the mine is carried within the slip stream.

Figure 7:
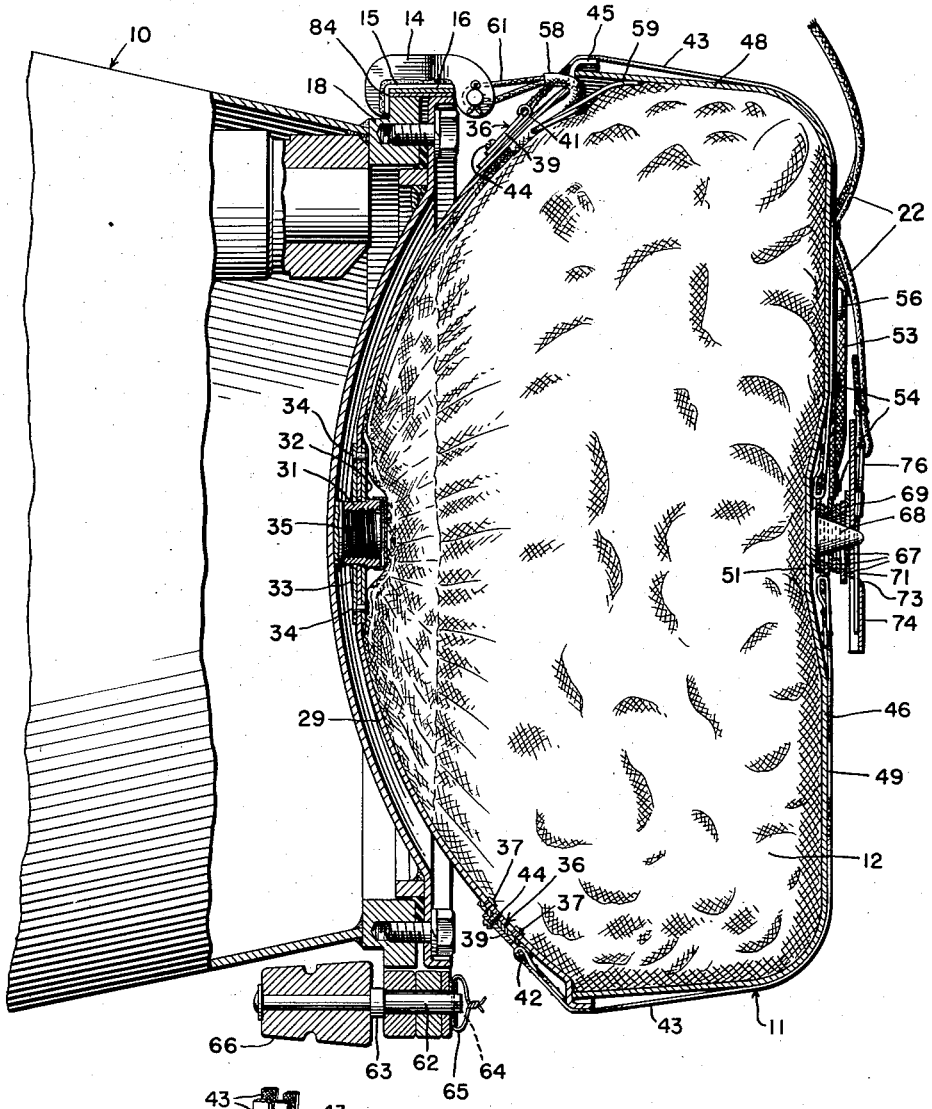
Fig. 7 is an enlarged view in elevation and partly broken away of the parachute pack of Fig. 1 and the supporting and releasing means therefor.
Figure 8:
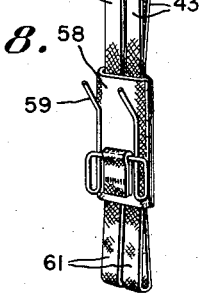
Fig. 8 shows a device suitable for preventing the premature withdrawal of the shroud line from the parachute pack.
Figure 9:
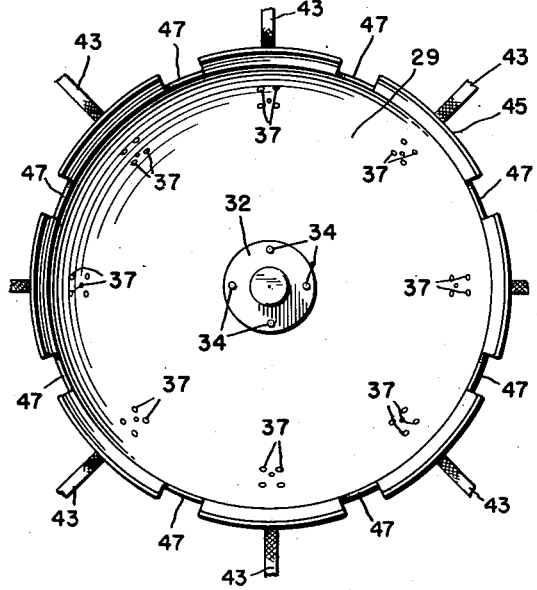
Fig. 9 is an end view of the portion of the parachute casing secured to the mine with the parachute and cover removed.
Figure 10:
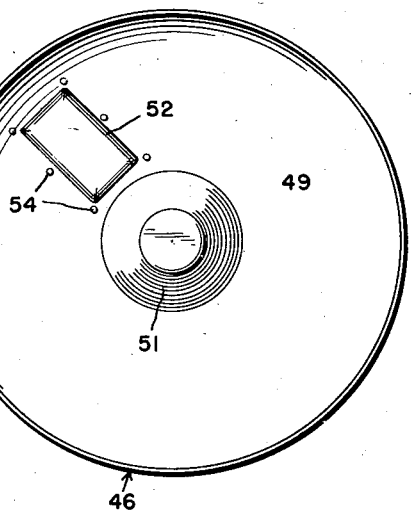
Fig. 10 shows the cover for the casing of Fig. 9 viewed from the inside.

The operation of the parachute pack is generally similar to the operation of the parachute pack of Fig. 7 and therefore only the inertia mechanism will be described. As the mine strikes the surface of the water, the inertia of the member 107 is sufficient to overcome the spring 108 and cause the member 107 to be moved forwardly. When this occurs, the locking balls 106 are released and moved inwardly thereby causing the outer ball race member 111 to be released from locking engagement with the member 104. The parachute and base 85 are thus disconnected from the mine at the moment of impact of the mine against the surface of the body of water.

Figure 22:
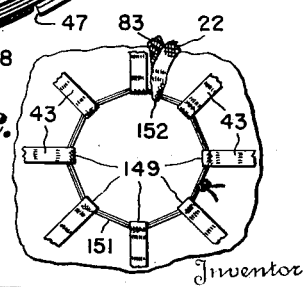

Whereas the parachute pack 11 is provided with an arming pin 71 controlled by the static cord for effecting the disconnection of the cover from the base, it will be understood that, if desired, various other devices and arrangements may be employed for this purpose such, for example, as the arrangement shown on Fig. 22 of the drawings in which the straps 43 are formed with looped portions 149 at one end thereof and a cord or line 151 is threaded through the looped portions a sufficient number of times to impart a desired degree of strength thereto and in which a static line such, for example, as the line 57 is connected to the cord 151 at a looped portion 152 formed on the static line. This arrangement provides means for securing the straps 43 in a manner such that the straps may be drawn taut by the toggle members 36 and in which, by providing a continuous cord 151 threaded through a looped portion of each of the straps 43, all of the straps are released simultaneously as the cord 151 is broken by a pull on the static line. Furthermore, if desired, the arrangement of Fig. 22 may be advantageously employed in connection with the parachute pack of Figs. 15 and 16 in lieu of the arming pin arrangement disclosed thereon for releasing the parachute from the pack.

Briefly stated in summary, the present invention contemplates the provision of a parachute pack of rigid construction adapted to stow tightly and protect the parachute from the effects of the weather when exposed thereto during the flight of an aircraft from which the parachute is launched and in which the pack invariably maintains a predetermined size and shape prior to the launching thereof. Furthermore, the invention provides means for invariably opening the pack when the load secured thereto has moved a predetermined distance from the aircraft after being dropped therefrom whereby the load may be planted with a high degree of accuracy within a relatively small target area, and in which means are provided for automatically disconnecting the parachute from the load as the load strikes the surface of a body of water or terra firma, as the case may be.

While the invention has been described with reference to two preferred examples thereof which give satisfactory results, it will be understood by those skilled in the art to which the invention pertains, after understanding the invention, that various changes and modifications may be made without departing from the spirit and scope of the invention, and it is intended, therefore, in the appended claims to cover all such changes and modifications.

The invention herein described and claimed may be manufactured and used by or for the Government of the United States of America for governmental purposes without payment of any royalties thereon or therefor.

What is claimed as new and desired to be secured by Letters Patent of the United States is:

1. A parachute pack comprising a pair of rigid separable sections, means for releasably connecting one of said sections to a load, means including a plurality of flexible tension members for bringing said sections together in registered engagement thereby to stow a parachute tightly therein, means for simultaneously releasing said flexible members thereby to disengage said sections, and means including an inertia element for disconnecting said one of the sections from the load as the load strikes a target surface.

2. A parachute pack of the character disclosed comprising two separable sections composed of rigid material and adapted to enclose a parachute, means for securing one of said sections to a load adapted to be dropped from an aircraft in flight, means including a plurality of strap members for detachably securing the other of said sections to said one of the sections, toggle means secured to said one of the sections for additionally tightening said strap members thereby to stow a parachute tightly therein, releasing means for said strap members, and means including a static line secured to said aircraft for operating said releasing means when the load has dropped a predetermined distance therefrom.

3. In a parachute pack adapted to release a parachute having a load secured thereto when the load has moved a predetermined distance from an aircraft in flight, a rigid dished member secured to said load and having a plurality of recessed portions about the periphery thereof, a rigid cover adapted to be brought into registered engagement with said dished member, a parachute adapted to be tightly stowed between said dished member and the cover when the cover is secured thereto, a plurality of shroud lines on the parachute and arranged within each of said recessed portions respectively, means for releasably securing the shroud lines to said load, means comprising an inertial element for disconnecting the shroud lines from the load as the load strikes a target surface and including a plurality of elongated flexible tensile members for releasably maintaining the cover in registered engagement with said dished member, and means for releasing said flexible members during the free downward movement of the load through the air thereby to disengage the cover from said dished member and cause the load to be suspended by the shroud lines from the parachute.

4. In a mine adapted to be launched from an aircraft in flight, in combination, a mine casing, a parachute pack comprising two separable complementary sections, means for securing one of said sections to said mine, means for releasably maintaining said sections in registered engagement until the mine has moved a predetermined distance from the aircraft, a parachute tightly stowed between said sections and having a plurality of shroud lines connected to the rim thereof, each of said shroud lines being releasably connected at the opposite end thereof to said mine, means for releasing said one of the sections during the free flight of the mine through the air thereby to cause the downward movement of the mine to be retarded by the parachute, and means including an inertia controlled member for disengaging the shroud lines from the mine as the mine strikes a target area.

5. A parachute pack of the character disclosed comprising a base and a detachable cover and adapted to stow a parachute therein, a load secured to said base and adapted to be released from an aircraft in flight, a plurality of shroud lines on said parachute detachably secured to said load, a plurality of elongated flexible tensile members secured to said base and adapted to secure the cover thereto, a plurality of lugs respectively connected to the ends of said tensile members, each of said lugs having an aperture therein, means including a conical member disposed within said apertures for releasably securing the ends of said tensile members together adjacent a central portion of said cover and exterior thereto, a pocket on said cover, and means including a static line for releasing said tensile members during the descent of the load through the air, said static line having a predetermined length thereof arranged within said pocket prior to the release of said tensile members.

6. In a parachute pack for a mine adapted to be carried within the slip stream of an aircraft in flight, a parachute within said pack having a plurality of shroud lines for connecting the parachute to the mine, a detachable cover for said pack, means including a plurality of elongated tensile members for releasably locking the cover to the pack while the mine is carried within said slip stream, a pocket on said cover, means including a static line secured at one end thereof to said aircraft for releasing said cover, said static line having a predetermined length thereof arranged within said pocket, means for lightly seizing the static line to the edge of said pocket at the points of emergence therefrom, and an additional length of static line secured to the rim of the parachute for quickly pulling the parachute from the pack when the cover thereof has been removed.

7. In a parachute pack for a mine adapted to be carried within the slip stream of an aircraft in flight, a parachute within said pack having a plurality of shroud lines for connecting the parachute to the mine, a detachable cover for said pack, means including a plurality of elongated tensile members for releasably locking the cover to the pack while the mine is carried within said slip stream, a pocket on said cover, means including a static line secured at one end thereof to said aircraft for releasing said cover, said static line having a predetermined length thereof arranged within said pocket, means for lightly seizing the static line to the edge of said pocket at the points of emergence therefrom, and an additional length of static line secured to the rim of the parachute for quickly pulling the parachute from the pack when the cover thereof has been removed, said additional length of static line including a frangible member adapted to disconnect the static line from the parachute when the parachute has been withdrawn from the pack.

8. In a mine adapted to be launched from an aircraft in flight and having a parachute pack secured thereto, a parachute within said pack and having a plurality of shroud lines extending therefrom, a circular member on the tail of said mine, an annular member adapted to be releasably locked to said circular member, means for connecting the shroud lines at intervals to said annular member, an inertia controlled device for releasably maintaining the annular member in locked engagement with said circular member, means for releasing the parachute from said pack when the mine has moved a predetermined distance from the aircraft thereby to cause the descent of the mine through the air to be retarded by the parachute, and means for causing said inertia controlled device to operate and thereby disengage the annular member from the circular member in response to the shock of impact of the mine against the surface of the body of water.

9. In a mine adapted to be released from an aircraft in flight, a parachute having a plurality of shroud lines and adapted to retard the fall of the mine through the air, means for releasably attaching the shroud lines to the mine, an inertia controlled member for disengaging the shroud lines from the mine as the mine strikes a target area, and means for preventing the operation of said inertia controlled member until a shock of predetermined strength is received by said inertia member.

10. A pack of the character disclosed comprising two separable sections and adapted to stow a parachute therein, means for releasably maintaining said sections in registered engagement, at least one of said sections having a plurality of recessed portions therein in substantial abutting relation with the other of said sections, a plurality of shroud lines secured to the parachute and arranged with a relatively short length thereof extending from each of said recessed portions respectively, a load secured to one of said sections and adapted to be carried within the slip stream of an aircraft, means for securing each of the shroud lines to said load, means including a static line connected to the aircraft for causing the sections to be separated when the load has moved a predetermined distance from the aircraft, and means including a plurality of devices respectively secured to the shroud lines and in engagement with the inner surface of the pack for preventing an additional length of the shroud line from being withdrawn from the pack by said slip stream prior to the release of the load from the aircraft.

11. In a parachute pack for a mine adapted to be launched from an aircraft in flight, said mine having a stabilizer therein within which the pack is disposed, a base member having an aperture centrally arranged therein, an annular member of greater diameter than said aperture and arranged coaxially therewith, a plurality of supports secured to said annular member adapted to engage the inner surface of said base member, a second annular member arranged within the first named annular member and in registered engagement therewith, an inertia controlled device for releasably locking said second annular member to the tail of the mine until the mine strikes a target area thereby to disconnect said base and supports from the mine, a cover for said base adapted to enclose and protect a parachute stowed therein and having a plurality of shroud lines connected to said supports, means for releasably locking the cover to said base until the mine has moved a predetermined distance from the aircraft, and means for preventing the operation of said inertia controlled device until the mine strikes the surface of a body of water.

12. In a parachute pack for a mine adapted to be launched from an aircraft in flight, the combination of a base section secured to the mine, a cover for said pack adapted to be brought into registered engagement with said base section, a plurality of pairs of straps secured to the base section, means for releasably securing the ends of each pair of straps thereby to bring the cover into registered engagement with said base, means including a pair of arming wires for releasably locking the cover to the base, a rip cord secured to said arming wires and having a looped portion intermediate the ends thereof, a parachute within said pack, and a static line secured to the looped portion of said rip cord and to said aircraft respectively and adapted to withdraw the arming wires and release the parachute when the mine has moved a predetermined distance from the aircraft.

13. In a parachute pack for a mine adapted to be launched from an aircraft in flight, the combination of a base section secured to the mine, a cover for said pack adapted to be brought into registered engagement with said base section, a plurality of pairs of straps secured to the base section, means for releasably securing the ends of each pair of straps thereby to bring the cover into registered engagement with said base, means including a pair of arming wires for releasably locking the cover to the base, a rip cord secured to said arming wires and having a looped portion intermediate the ends thereof, a parachute within said pack, a static line secured to the looped portion of said rip cord and to said aircraft respectively and adapted to withdraw the arming wires and release the parachute when the mine has moved a predetermined distance from the aircraft, and a pocket on said cover within which a predetermined length of said static line is stored prior to the release of the mine from the aircraft.

14. In a parachute pack for a mine adapted to be launched from an aircraft in flight, the combination of a base section secured to the mine, a cover for said pack adapted to be brought into registered engagement with said base section, a plurality of pairs of straps secured to the base section, means for releasably securing the ends of each pair of straps thereby to bring the cover into registered engagement with said base, means including a pair of arming wires for releasably locking the cover to the base, a rip cord secured to said arming wires and having a looped portion intermediate the ends thereof, a parachute within said pack, a static line secured to the looped portion of said rip cord and to said aircraft respectively and adapted to withdraw the arming wires and release the parachute when the mine has moved a predetermined distance from the aircraft, a pocket on said cover within which a predetermined length of said static line is stored prior to the release of the mine from the aircraft, and means for preventing the arming wires from being withdrawn until said predetermined length of static line has been withdrawn from said pocket.

15. A parachute pack of the character disclosed comprising two separable sections composed of rigid material and adapted to enclose a parachute, means for securing one of said sections to a load adapted to be dropped from an aircraft in flight, means including a plurality of strap members for detachably securing the other of said sections to said one of the sections, toggle means secured to said one of the sections for additionally tightening said strap members thereby to stow a parachute tightly therein, means for locking the toggle member when the strap members have been additionally tightened thereby, releasing means for said strap members, and means including a static line secured to the aircraft for operating said releasing means when the load has dropped a predetermined distance therefrom.

GRAHAM B. BROWN.

REFERENCES CITED

The following references are of record in the file of this patent:

UNITED STATES PATENTS

| Number | Name | Date |
|---|---|---|
| 1,165,891 | Martin | Dec. 28, 1915 |
| 1,442,345 | Kee | Jan. 16, 1923 |
| 1,795,168 | Habermehl | Mar. 3, 1931 |
| 1,909,158 | Albihn | May 16, 1933 |
| 2,327,359 | Manson | Aug. 24, 1943 |
| 2,345,616 | Manson | Apr. 4, 1944 |

FOREIGN PATENTS

| Number | Country | Date |
|---|---|---|
| 155,787 | Great Britain | Dec. 23, 1920 |
| 693,336 | France | Aug. 19, 1930 |